United States Patent
Curtis et al.

(10) Patent No.: US 8,333,264 B2
(45) Date of Patent: Dec. 18, 2012

(54) SIDE COVER HAVING FLUID LEVEL CONTROL FOR A TRANSMISSION

(75) Inventors: Tami A Curtis, South Lyon, MI (US); Ronald A Spindler, Milford, MI (US); Pete R. Garcia, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 324 days.

(21) Appl. No.: 12/844,191

(22) Filed: Jul. 27, 2010

(65) Prior Publication Data

US 2011/0036200 A1 Feb. 17, 2011

Related U.S. Application Data

(60) Provisional application No. 61/233,622, filed on Aug. 13, 2009.

(51) Int. Cl.
*F16H 57/02* (2012.01)
(52) U.S. Cl. .................................................. 184/6.12
(58) Field of Classification Search ............... 184/6.12; 123/196 R; 74/606 R
See application file for complete search history.

(56) References Cited

U.S. PATENT DOCUMENTS

| | | | | |
|---|---|---|---|---|
| 3,864,875 | A | * | 2/1975 | Hewitt ............................ 49/115 |
| 4,905,643 | A | * | 3/1990 | DeGrazia, Jr. .............. 123/196 S |
| 6,058,898 | A | * | 5/2000 | Freese, V ................... 123/195 C |
| 6,233,929 | B1 | * | 5/2001 | Okada et al. ..................... 60/456 |
| 6,845,743 | B1 | * | 1/2005 | Bishop ....................... 123/195 C |
| 7,080,660 | B2 | * | 7/2006 | Jennings ........................ 137/510 |
| 7,509,935 | B2 | * | 3/2009 | Vincer et al. .............. 123/195 C |
| 7,806,142 | B2 | * | 10/2010 | Baros et al. ..................... 137/878 |
| 2006/0243528 | A1 | * | 11/2006 | Bukhari et al. .............. 184/27.1 |
| 2006/0260872 | A1 | * | 11/2006 | Schnorr et al. ................. 184/3.1 |
| 2009/0000675 | A1 | * | 1/2009 | Baros et al. .................... 137/538 |

* cited by examiner

*Primary Examiner* — Michael Mansen
*Assistant Examiner* — Mark K Buse

(57) ABSTRACT

A side cover for use in a transmission includes an inner surface and a wall. The wall extends along the outer periphery of the side cover. The inner surface and the wall cooperate to define a cavity. A fluid control valve is disposed in the bottom of the side cover within the cavity. The fluid control valve controls the height of hydraulic fluid in the side cover by varying flow to the sump. The cavity includes a fluid storage portion in communication with the valve. The fluid storage portion has a volume that is greater at a bottom of the side cover than at a top of the side cover. The fluid storage portion controls the pressure of the hydraulic fluid at the valve.

18 Claims, 5 Drawing Sheets

SIDE COVER HAVING FLUID LEVEL CONTROL FOR A TRANSMISSION

CROSS-REFERENCE TO RELATED APPLICATIONS

This application claims priority to U.S. Provisional Application No. 61/233,622 filed on Aug. 13, 2009, which is hereby incorporated in its entirety herein by reference.

FIELD

The present disclosure relates to side covers in transmissions, and more particularly to a side cover that controls fluid level within the side cover for a front wheel drive transmission.

BACKGROUND

The statements in this section merely provide background information related to the present disclosure and may or may not constitute prior art.

A typical multi-speed transmission uses a combination of clutches and brakes or several dog clutch/synchronizers to achieve a plurality of forward or reverse gear ratios. Typically an electronically controlled hydraulic control circuit or system uses a hydraulic fluid to actuate these torque transmitting mechanisms, as well as to lubricate and cool the transmission. The hydraulic fluid is typically stored in a fluid reservoir, or sump, located at a bottom of the transmission.

In some transmission architectures, there is a need for additional hydraulic fluid storage in a front or side cover of the transmission when the sump cannot hold all the hydraulic fluid. Typically, the sump is unable to hold the hydraulic fluid when the temperature of the hydraulic fluid increases, thereby increasing the volume required to store the hydraulic fluid. Without the additional storage capacity of the side cover, hydraulic fluid can contact moving parts, such as gear sets or torque transmitting mechanisms, and create higher spin losses which can in turn decrease fuel economy. A fluid level control valve located between the side cover and the sump controls the flow of the hydraulic fluid from the side cover to the sump. The fluid level control valve is typically fully open at low transmission operating temperatures to allow unrestricted hydraulic fluid flow from the side cover to the sump and fully closed at high transmission operating temperatures to restrict the hydraulic fluid flow from the side cover to the sump. However, pressure on the fluid level control valve due to large amounts of fluid in the side cover can force open the fluid level control valve. Accordingly, the amount of fluid within the sump can have significant variations depending on how much fluid is in the side cover. Additionally, when the transmission is operating with many shift events, hydraulic fluid from the hydraulic control system can flood the side cover, thereby increasing the amount of fluid in the side cover and increasing the pressure on the flow control valve, and again leading to unwanted variations in the amount of fluid in the sump.

Therefore, there is a need in the art for a side cover that controls the fluid flow from the side cover to the sump, eliminates dead volume in the side cover and thereby allows a constant sump volume.

SUMMARY

A side cover for use in a transmission is provided. The side cover includes an inner surface and a wall. The wall extends along the outer periphery of the side cover. The inner surface and the wall cooperate to define a cavity. A fluid control valve is disposed in the bottom of the side cover within the cavity. The fluid control valve controls the flow of hydraulic fluid from the side cover. The cavity includes a fluid storage portion in communication with the valve. The fluid storage portion has a surface that is contoured such that the volume of the fluid storage portion is greater near a bottom of the side cover than near a top of the side cover. The fluid storage portion controls the pressure of the hydraulic fluid at the valve.

In one example of the present invention, the volume of the fluid storage portion decreases from the bottom towards the top of the side cover.

In another example of the present invention, the valve is disposed in a valve housing integrally formed in a bottom of the cavity.

In yet another example of the present invention, the valve is a thermal valve that opens and closes a door in the valve housing to control the flow of fluid from the cavity.

In yet another example of the present invention, the valve is in communication with a sump located in the transmission.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
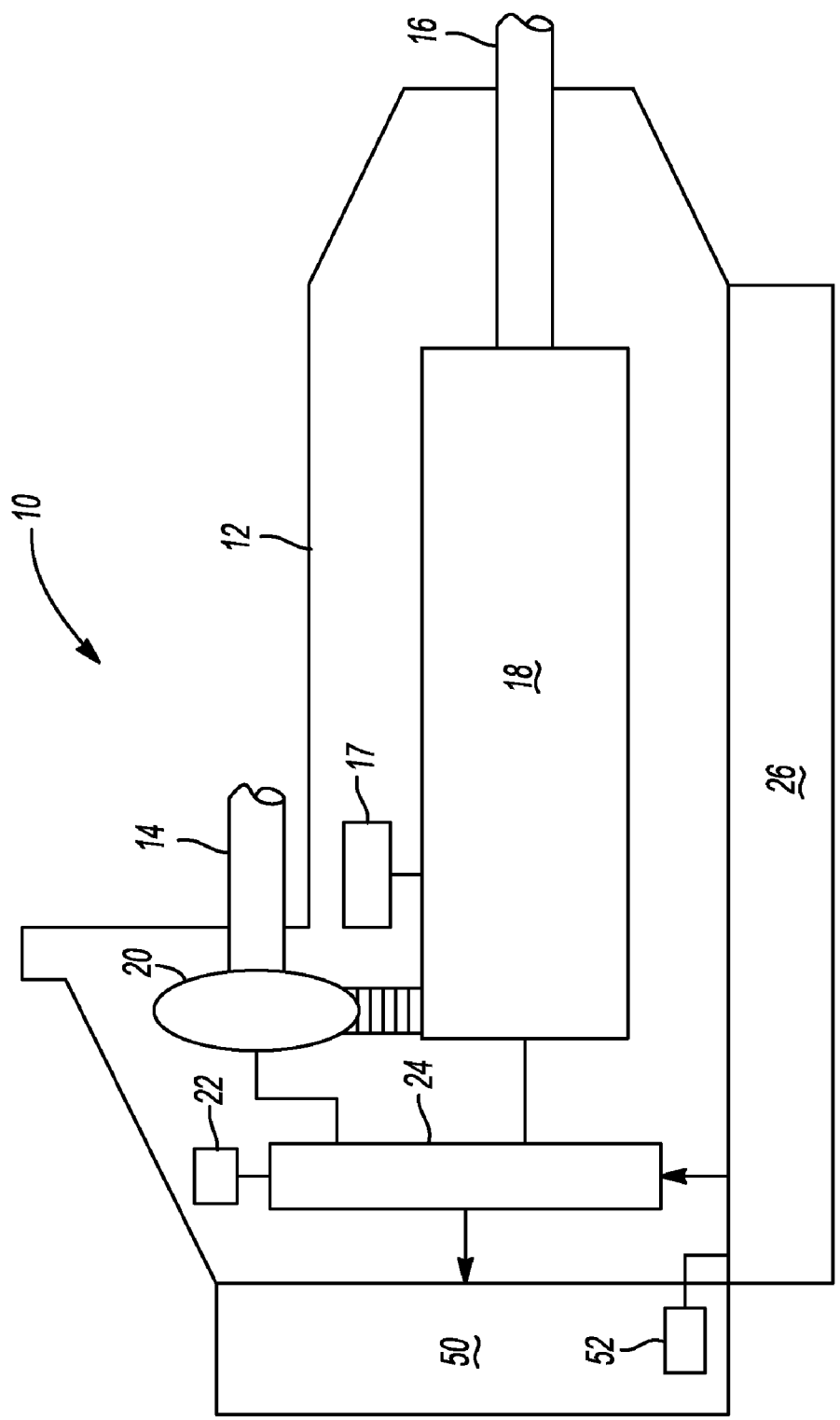
FIG. 1 is a schematic diagram of a transmission having a side cover according to the principles of the present invention.
Figure 2:
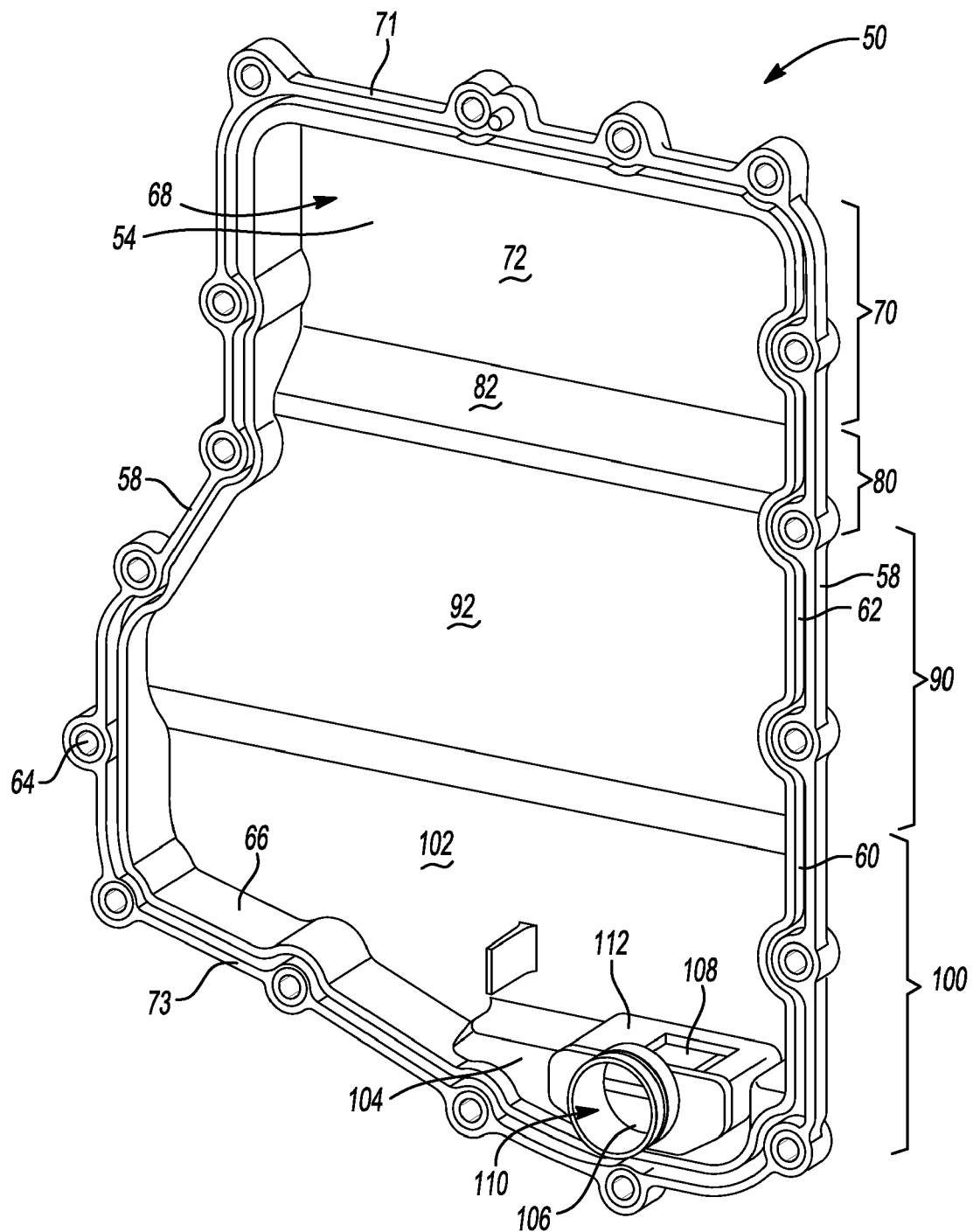
FIG. 2 is a back isometric view of a side cover according to the principles of the present invention.
Figure 3:
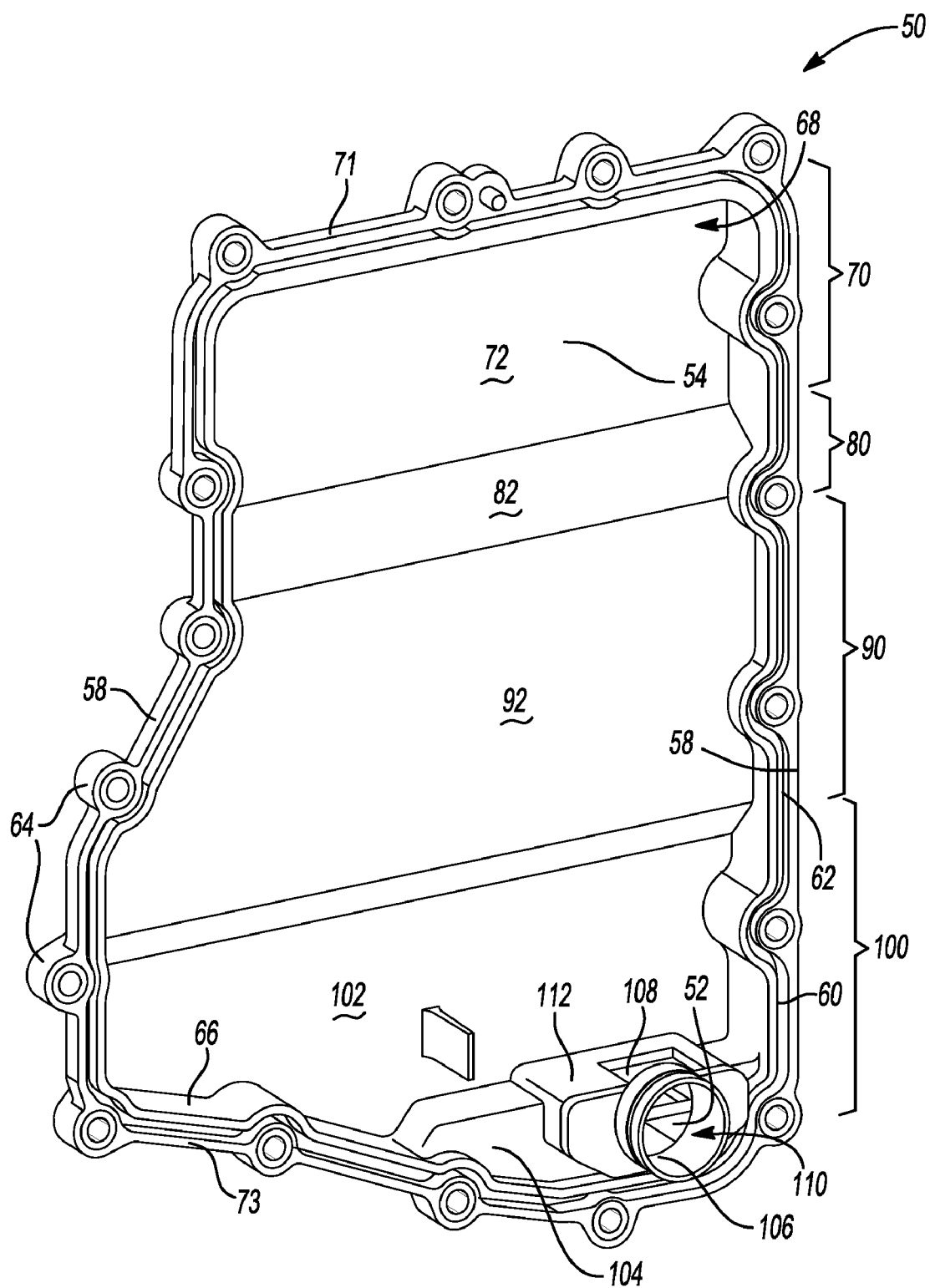
FIG. 3 is another back isometric view of the side cover according to the principles of the present invention.
Figure 4:
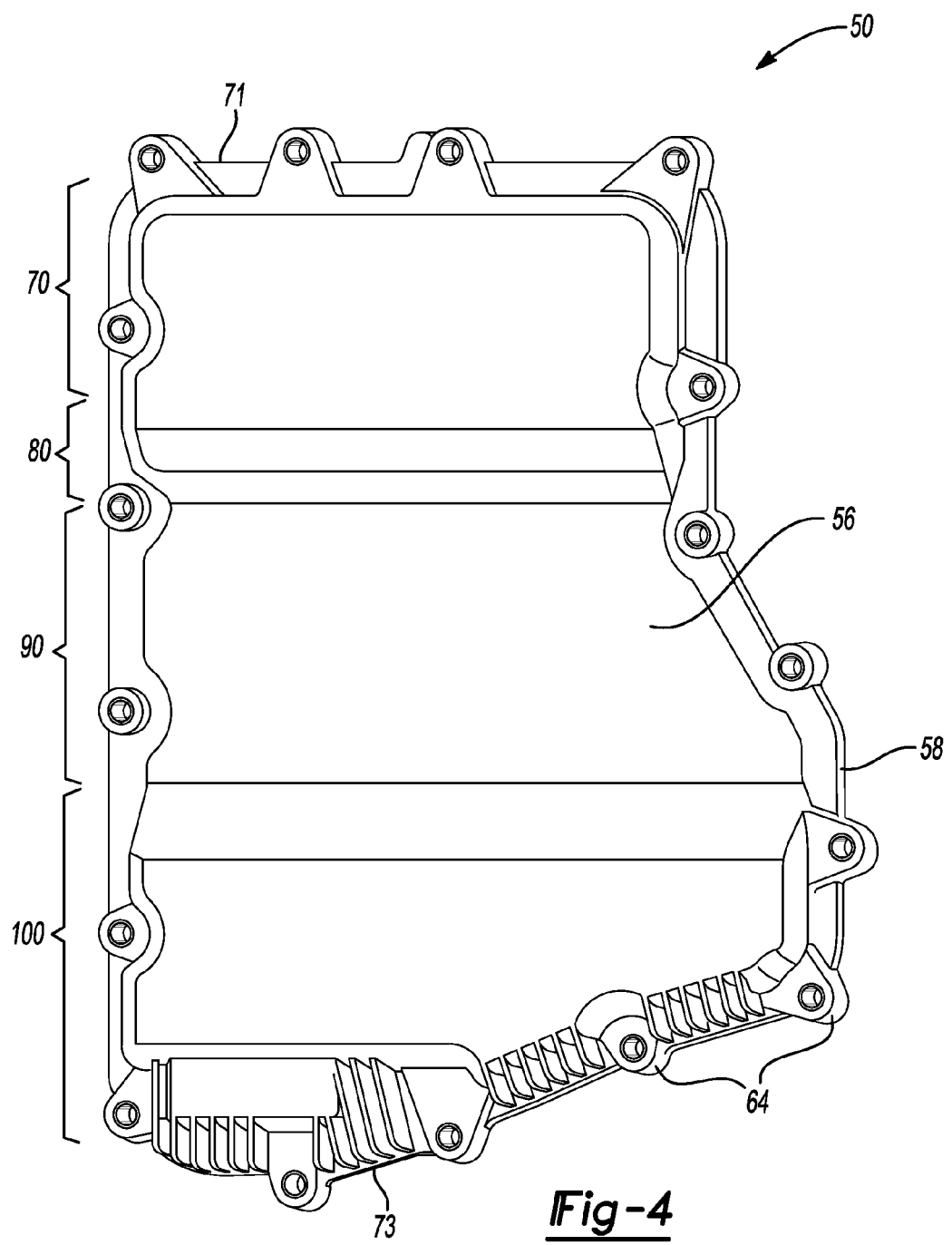
FIG. 4 is a front isometric view of the side cover according to the principles of the present invention.
Figure 5:
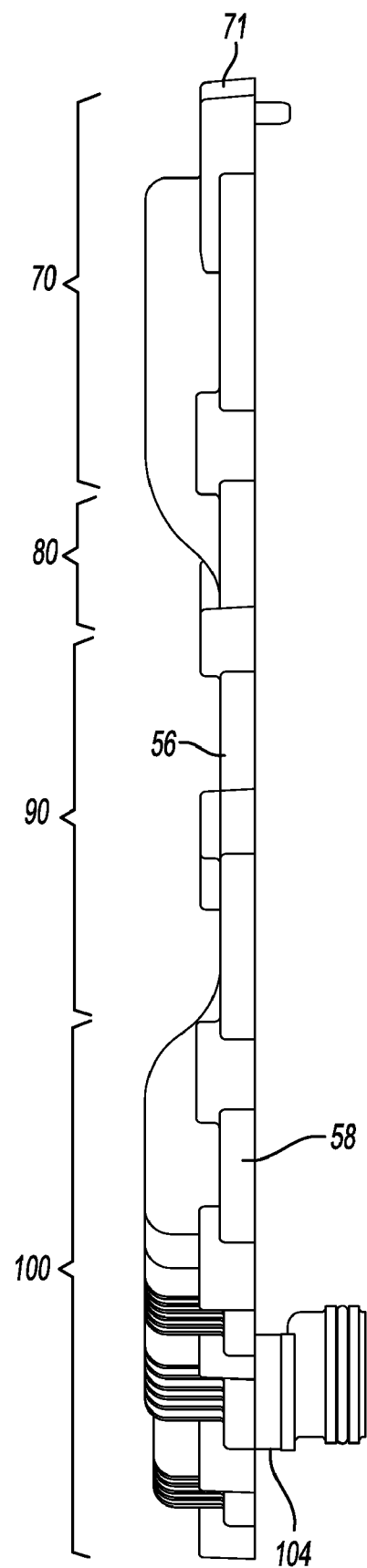
FIG. 5 is side view of the side cover according to the principles of the present invention.

With reference to FIG. 1, a schematic diagram of an exemplary transmission is generally indicated by reference number 10. The transmission 10 is an automatic, front wheel drive, multiple speed hybrid drive unit. However it should be appreciated that the transmission may be a manual transmission or any other type of transmission without departing from the scope of the present invention. The transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, an electric motor 17, and an exemplary gear arrangement 18. The input shaft 14 is connected with a prime mover (not shown) via a torque converter 20. The prime mover may be an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the gear arrangement 18 through the torque converter 20. The electric motor 17 is also connected to and drives the gear arrangement 18.

The gear arrangement 18 may take various forms and configurations but generally includes a plurality of gear sets, a plurality of shafts or interconnecting members, and at least one torque transmitting mechanism. The gear set may include intermeshing gear pairs, planetary gear sets, or any other type of gear set. The plurality of shafts may include layshafts, countershafts, sleeve or center shafts, reverse or idle shafts, or combinations thereof. The torque transmitting mechanisms may include clutches, brakes, synchronizer assemblies or dog clutches, or combinations thereof, without departing from the scope of the present invention.

The transmission 10 also includes a transmission control module 22. The transmission control module 22 is preferably an electronic control device having a preprogrammed digital computer or processor, control logic, memory used to store data, and at least one I/O peripheral. The control logic includes a plurality of logic routines for monitoring, manipulating, and generating data. The transmission control module 22 controls the actuation of the torque transmitting mechanisms in the gear arrangement 18 via a hydraulic control system 24. The hydraulic control system 24 generally includes electrically controlled solenoids and valves that selectively communicate hydraulic fluid throughout the transmission 10 in order to control, lubricate, and cool the various components of the transmission 10.

The hydraulic fluid used by the hydraulic control system 24 is primarily stored in a sump or reservoir 26. The sump 26 is preferably located at a bottom of the transmission 10. A pump (not shown) produces a suction that draws the hydraulic fluid from the sump 26 and into the hydraulic control system 24 where the hydraulic fluid is used to engage torque transmitting mechanisms and to cool and lubricate the transmission 10.

The transmission 10 further includes a side cover 50 according to the principles of the present invention. The side cover 50 is attached to a side or front of the transmission 10. The side cover 50 is used to store excess hydraulic fluid from the sump 26 as well as store hydraulic fluid delivered directly from the hydraulic control system 24. Communication of the hydraulic fluid from the side cover 50 to the sump 26 is controlled via a valve 52, as will be described in greater detail below.

Turning to FIGS. 2-5, the side cover 50 includes an inner surface 54 and an outer surface 56. When the side cover 50 is connected to the transmission 10 the inner surface 54 is disposed facing the transmission 10 and the outer surface 56 is disposed facing away from the transmission 10. The side cover 50 further includes a wall or rim 58 that extends perpendicularly out from the inner surface 54. The wall 58 is disposed around the entire outer periphery of the side cover 50. A seal 60 is disposed on an end surface 62 of the wall 58. When the side cover 50 is connected to the transmission 10, the seal 60 seals the side cover 50 to the housing 12 of the transmission 10. In the example provided, the side cover 50 includes a plurality of bolt holes 64 disposed in the wall 58 along the outer periphery of the side cover 50 for receiving a plurality of bolts (not shown) in order to connect the side cover 50 to the housing 12 of the transmission 10. However, it should be appreciated that the side cover 50 may be connected to the transmission 10 using various other connection types, such as other types of fasteners or adhesives, without departing from the scope of the present invention.

The inner surface 54 and an inner face 66 of the wall 58 cooperate to define a space or cavity 68 within the side cover 50. The cavity 68 is divided into four, but not limited to four, distinct portions or volumes. A first portion or cover portion 70 is located at a top 71 of the side cover 50. The top 71 of the side cover 50 is defined as the end of the side cover 50 farthest from the sump 26 when the side cover 50 is attached to the transmission 10. A bottom 73 of the side cover 50 is defined as the end of the side cover 50 closest to the sump 26 when the side cover 50 is attached to the transmission 10. The first portion 70 is defined by a first inner surface portion 72 and the wall 58. The first inner surface portion 72 has a shape that is preferably a function of whatever space is needed to cover the components of the transmission 10 and is sized to contain any case spill over the wall opening of the transmission 10.

A second portion or transition portion 80 of the cavity 68 is located adjacent and below the first portion 70. The second portion 80 is defined by a second inner surface portion 82 and the wall 58. The second inner surface portion 82 is angled with respect to the first inner surface portion 72. Alternatively, the second inner surface portion 82 could be perpendicular with respect to the first inner surface portion 72 (i.e., in the shape of a step). The second portion 80 has a linearly decreasing volume as measured from the top 71 towards the bottom 73 of the side cover 50. The second portion 80 is a transition between the first portion 70 and a third portion 90 and therefore may have various configurations and shapes without departing from the scope of the present invention.

The third portion or fluid storage portion 90 of the cavity 68 is located adjacent and below the second portion 80. The third portion 90 is defined by a third inner surface portion 92 and the wall 58. The third inner surface portion 92 is planar and can be angled with respect to the end surface 62 of the wall 58. In the example provided, however, the third inner surface portion 92 is parallel with the wall 58. The third portion 90 increases in volume as measured from the top 71 towards the bottom 73 of the side cover 50 due to a narrowing of the distance "A" between opposing side walls 58. The distance "A" decreases linearly in a direction from the bottom 73 to the top 72 of the side cover 50. The third portion 90 is used to store hydraulic fluid from the hydraulic control system 24 and the sump 26. The angle of the distance "A" with respect to the third surface portion 92, and therefore the rate of change of the volume of the third portion 90 with respect to the distance from the bottom 73 of the side cover 50, is a function of the desired head pressure on the valve 52 for a given amount of hydraulic fluid stored in the side cover 50.

Finally, a fourth portion or base portion 100 is located between the third portion 90 and the bottom 73 of the side cover 50. The fourth portion 100 is defined by a fourth inner surface portion 102 and the wall 58. The fourth inner surface portion 102 is planar and is parallel with the end surface 62 of the wall 58. The fourth portion 100 has a constant volume as measured from the top 71 towards the bottom 73 of the side cover 50.

A valve housing 104 is located within the fourth portion 100. The valve housing 104 is preferably integrally formed on an inner surface of the wall 58 at the bottom 73 of the side cover 50. The valve housing 104 defines a cavity 106. The valve housing 104 includes a first opening 108 that communicates between the fourth portion 100 of the cavity 68 and the cavity 106. A moveable door 112 is disposed within the valve housing 104 over the first opening 108. The door 112 is operable to selectively open to allow communication between the cavity 106 and the fourth portion 100 and close to prevent communication between the cavity 106 and the fourth portion 100. The valve housing 104 further includes a second opening 110 that communicates between the sump 26 and the cavity 106. The first opening 108 and the second opening 110 are preferably at right angles with respect to one another.

The valve 52 is disposed within the cavity 106 of the valve housing 104. The valve 52 is preferably a thermal valve that is engageable with the door 112. The valve 52 is operable to open and close the door 112 as a function of the temperature of the hydraulic fluid in contact with the valve 52.

With combined reference to FIGS. 1-5, during operation of the transmission 10 the amount of hydraulic fluid within the side cover 50 varies. As the temperature of the hydraulic fluid increases, the hydraulic fluid expands. The side cover 50 stores hydraulic fluid to compensate for the expansion of the fluid to keep the sump 26 at a constant volume. In addition, hydraulic fluid within the hydraulic control system 24 exhausts to the side cover 50. As the third portion 90 of the side cover 50 fills with hydraulic fluid, the reducing volume increases the height of the hydraulic fluid within side cover 50, therefore the rate of increase at the pressure head at the door 112 increases as the third portion fills with hydraulic fluid. This increasing pressure head rate exerts a force on the door 112 which opens the door 112 at a predefined setting, thereby increasing the amount of fluid communicated from the side cover 50 to the sump 26. Because the volume of the third portion 90 varies according to height, small increases in hydraulic fluid within the side cover 50 disproportionately increases the pressure head, thus the volume in the sump 26 is kept relatively stable.

The description of the invention is merely exemplary in nature and variations that do not depart from the gist of the invention are intended to be within the scope of the invention. Such variations are not to be regarded as a departure from the spirit and scope of the invention.

The invention claimed is:

1. A side cover for a transmission, the transmission having a sump for storing hydraulic fluid, the side cover comprising:
   a body connected to the transmission, the body including:
      an inner surface;
      a wall disposed along an outer periphery of the inner surface configured to seal to the transmission, the wall having opposing top and bottom wall surfaces and opposing side wall surfaces;
      wherein the inner surface and the surfaces of the wall cooperate to define a space having a first portion proximate the bottom wall surface and a second portion disposed above the first portion, wherein the space is at least partially filled with the hydraulic fluid, wherein a planar horizontal cross-sectional area through the second portion decreases from a first distance from the bottom wall surface to a second distance from the bottom wall surface, and wherein the first distance is less than the second distance; and
   a valve assembly connected to the inner surface of the body within the first portion, the valve assembly having a first port in communication with the first portion and a second port in communication with the sump, and
   wherein the decreasing planar horizontal cross-sectional area through the second portion is configured to control a pressure of the hydraulic fluid at the first port and when the pressure of the hydraulic fluid at the first port exceeds a predefined pressure, the first port opens to allow hydraulic fluid communication through the valve assembly to the sump.

2. The side cover of claim 1 wherein at least one of the side wall surfaces is angled with respect to a vertical plane towards the other of the side wall surfaces between the first distance and the second distance.

3. The side cover of claim 1 wherein the inner surface is angled with respect to a vertical plane towards the transmission between the first distance and the second distance.

4. The side cover of claim 1 wherein the rate of decrease of the planar horizontal cross-sectional area from the first distance to the second distance is constant.

5. The side cover of claim 1 further comprising a hollow housing disposed in the first portion and integrally formed with the inner surface and the bottom wall surface, wherein the first port is located in a top surface of the hollow housing and the second port is located in a side surface of the hollow housing.

6. The side cover of claim 5 wherein the first port is at a right angle to the second port.

7. The side cover of claim 6 wherein the valve assembly is disposed within the hollow housing and includes a pivotal door within the housing proximate the first port, wherein the door is selectively moveable to close the first port to the second port and to open the first port to the second port, and wherein the pressure head of the hydraulic fluid acts on the pivotal door.

8. The side cover of claim 7 wherein the valve assembly includes a thermal valve that is connected with the door and is configured to open and close the door as a function of a temperature of the hydraulic fluid in contact with the thermal valve.

9. The side cover of claim 8 wherein the opening of the door is a function of the operation of the thermal valve and the pressure head acting on the door.

10. A transmission comprising:
    a housing having a vertical side;
    a sump connected to the housing and configured to store a hydraulic fluid;
    a side cover comprising:
       a body connected to the transmission, the body including:
          an inner surface;
          a wall disposed along an outer periphery of the inner surface configured to seal to the transmission, the wall having opposing top and bottom wall surfaces and opposing side wall surfaces, wherein the wall is connected to the vertical side of the housing;
          wherein the inner surface and the surfaces of the wall cooperate to define a space having a first portion proximate the bottom wall surface and a second portion disposed above the first portion, wherein the space is at least partially filled with the hydraulic fluid, wherein a planar horizontal cross-sectional area through the second portion decreases from a first distance from the bottom wall surface to a second distance from the bottom wall surface, and wherein the first distance is less than the second distance; and
       a valve assembly connected to the inner surface of the body within the first portion, the valve assembly having a first port in communication with the first portion and a second port in communication with the sump, and
       wherein the decreasing planar horizontal cross-sectional area through the second portion is configured to control a pressure of the hydraulic fluid at the first port and when the pressure of the hydraulic fluid at the first port exceeds a predefined pressure, the first port opens to allow hydraulic fluid communication through the valve assembly to the sump.

11. The transmission of claim 10 wherein at least one of the side wall surfaces is angled with respect to a vertical plane towards the other of the side wall surfaces between the first distance and the second distance.

12. The transmission of claim 10 wherein the inner surface is angled with respect to a vertical plane towards the transmission between the first distance and the second distance.

13. The transmission of claim 10 wherein the rate of decrease of the planar horizontal cross-sectional area from the first distance to the second distance is constant.

14. The transmission of claim 10 further comprising a hollow housing disposed in the first portion and integrally formed with the inner surface and the bottom wall surface, wherein the first port is located in a top surface of the hollow housing and the second port is located in a side surface of the hollow housing.

15. The transmission of claim 14 wherein the first port is at a right angle to the second port.

16. The transmission of claim 15 wherein the valve assembly is disposed within the hollow housing and includes a pivotal door within the housing proximate the first port, wherein the door is selectively moveable to close the first port to the second port and to open the first port to the second port, and wherein the pressure head of the hydraulic fluid acts on the pivotal door.

17. The transmission of claim 16 wherein the valve assembly includes a thermal valve that is connected with the door and is configured to open and close the door as a function of a temperature of the hydraulic fluid in contact with the thermal valve.

18. The transmission of claim 17 wherein the opening of the door is a function of the operation of the thermal valve and the pressure head acting on the door.

* * * * *